United States Patent

Shah et al.

(10) Patent No.: US 7,997,643 B2
(45) Date of Patent: Aug. 16, 2011

(54) ROOF ASSEMBLY FOR A VEHICLE

(75) Inventors: Sanjay M. Shah, Troy, MI (US); Elaine M. Garcia, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 12/492,540

(22) Filed: Jun. 26, 2009

(65) Prior Publication Data

US 2010/0327620 A1    Dec. 30, 2010

(51) Int. Cl.
*B62D 25/06* (2006.01)
*B62D 25/02* (2006.01)

(52) U.S. Cl. .................. 296/210; 296/203.03
(58) Field of Classification Search .............. 296/210, 296/203.03
See application file for complete search history.

(56) References Cited

U.S. PATENT DOCUMENTS

| | | | | |
|---|---|---|---|---|
| 6,002,098 A * | 12/1999 | Pircher et al. | ............ | 219/121.64 |
| 6,825,442 B2 * | 11/2004 | Schroth et al. | ........ | 219/137 WM |
| 2005/0045603 A1 * | 3/2005 | Kiehl | ........................ | 219/121.64 |
| 2005/0230371 A1 * | 10/2005 | Kutsuna et al. | .......... | 219/121.85 |
| 2007/0262056 A1 * | 11/2007 | Schwaegler et al. | ............ | 219/83 |
| 2008/0178467 A1 * | 7/2008 | Hayashi et al. | .............. | 29/897.2 |
| 2009/0294410 A1 * | 12/2009 | Iwase et al. | ................ | 219/91.23 |
| 2010/0098969 A1 * | 4/2010 | Hashimura et al. | ........... | 428/653 |

OTHER PUBLICATIONS

Aluminium/Steel Construction of the BMW 5 Series; I-Car Advantage Online; Nov. 10, 2003, 2 pages.
Edgar, Julian; Aluminium Car Construction, Forget welds—instead try rivets and glue!; Autospeed, Jul. 20, 2006, Issue 390, 7 pages.
Aluminium Vehicles in the Future. Are we ready?; KnowledgeNews, Oct. 2006, No. 1, 4 pages.

* cited by examiner

*Primary Examiner* — Dennis Pedder
(74) *Attorney, Agent, or Firm* — Lionel D. Anderson; Reising Ethington P.C.

(57) ABSTRACT

A roof assembly for a vehicle that includes a center roof panel made from a lightweight material like aluminum, a surrounding attachment flange made from a more formable and stronger material like steel, and a junction that connects the roof panel and the attachment flange together. The aluminum-based roof panel may reduce the overall weight of the assembly, while the steel-based attachment flange may improve its metal forming and attachment capabilities.

18 Claims, 2 Drawing Sheets

US 7,997,643 B2

ROOF ASSEMBLY FOR A VEHICLE

TECHNICAL FIELD

The present invention generally relates to a roof assembly for a vehicle and, more particularly, to a roof assembly that includes a roof panel and an attachment flange made from different materials.

BACKGROUND

Different techniques have been used to reduce the weight of a vehicle while still maintaining its structural integrity. For example, tailor welded blanks and other components are sometimes used in vehicle doors, hoods, decklids, and other bolt-on assemblies.

In the case of a tailor welded blank for a vehicle inner door panel, a piece of thin gauge metal can be used for the majority of the door panel and a stronger piece of thick gauge metal can be attached to where the door panel carries the door hinges. This way, the door panel has the requisite strength in the critical areas (i.e., where the door hinges carry the weight of the door) but is lighter in the other areas where the structural demands are not as high. However, using tailor welded blanks for non-bolt-on or weld-on assemblies, like a vehicle roof panel, can present a number of different challenges.

SUMMARY

According to one embodiment, there is provided a roof assembly for a vehicle. The roof assembly may comprise a roof panel made from a first material, and an attachment flange made from a second material that is different than the first material. The attachment flange extends along at least a portion of an outer periphery of the roof panel and attaches to a structural member of the vehicle.

According to another embodiment, there is provided a roof assembly for a vehicle. The roof assembly may comprise a roof panel made from a first material that includes aluminum, an attachment flange made from a second material that includes steel, and a junction between the roof panel and the attachment flange. The junction includes a butt joint that has both the first and second materials and is arranged so that outer surfaces of the roof panel and the attachment flange are flush with one another.

DRAWINGS

Preferred exemplary embodiments of the invention will hereinafter be described in conjunction with the appended drawings, wherein like designations denote like elements, and wherein.

DETAILED DESCRIPTION

Figure 1:
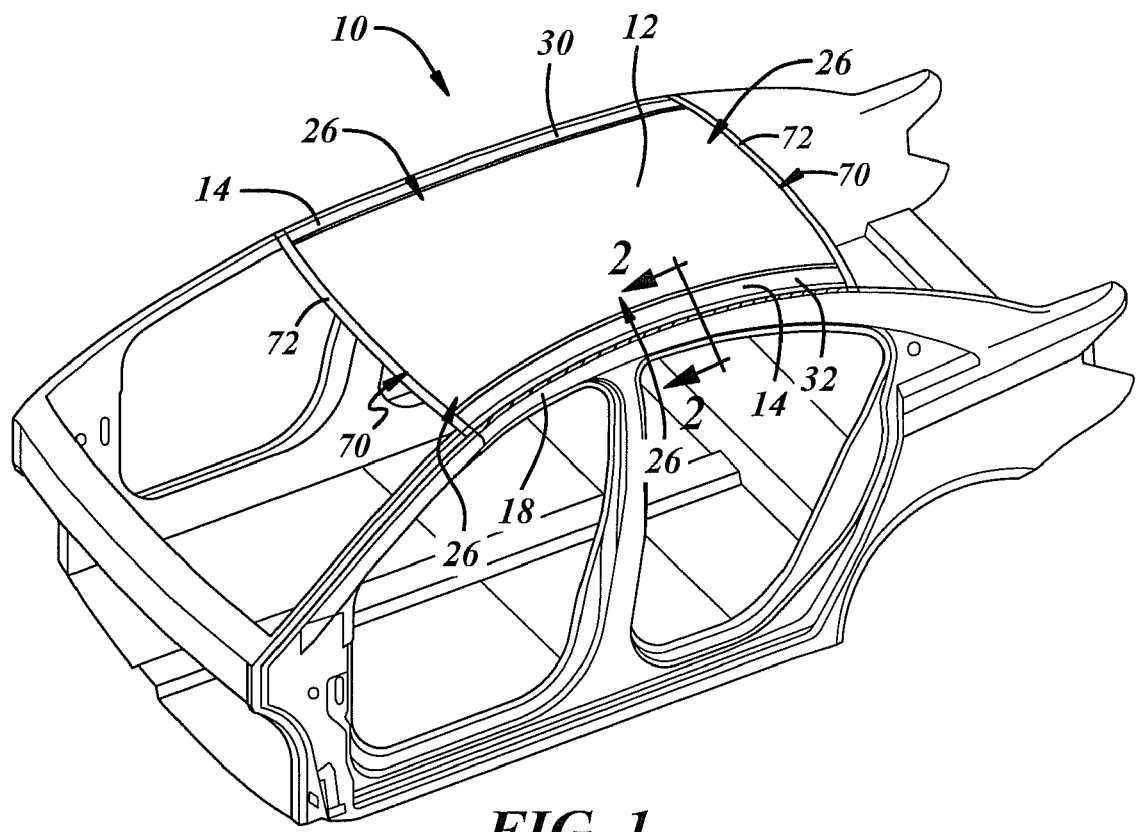
FIG. 1 is a isometric view of an exemplary roof assembly mounted to a vehicle that is in a body in white (BIW) stage.

According to the exemplary embodiment shown here, roof assembly 10 includes a roof panel 12 made from a lightweight material like aluminum, a surrounding attachment flange 14 made from a more formable and stronger material like steel, and a junction 16 that connects the roof panel and attachment flange together. The aluminum-based roof panel 12 reduces the overall weight of the assembly, while the steel-based attachment flange 14 improves its metal forming and attachment capabilities.

To illustrate, consider the assembly process that is commonly used to make a vehicle body or shell. The end product of this process, before the vehicle body goes to a paint shop, is commonly referred to as a body in white (BIW). The various parts that make up the vehicle body, including the roof and body side panels, are typically produced on separate manufacturing lines or even at separate manufacturing facilities, and are then joined together at an assembly plant. This assembly process largely takes place within a weld shop or welding area. If an aluminum roof panel is directly attached to a steel body side panel, without an attachment flange such as that described herein, then certain manufacturing difficulties can arise. For example, aluminum does not form as readily as other materials, such as steel, and may present challenges when trying to form corners having tight radii or other contours that are difficult to produce. In addition, joining an aluminum roof panel to a steel body side panel is usually accomplished with self piercing rivets (SPRs) and adhesive compounds which can require costly equipment, may add to the complexity and cost of the manufacturing process, and can limit some of the design parameters of the vehicle (e.g., a wider roof ditch may be needed to accommodate the SPR equipment).

Roof assembly 10, on the other hand, includes attachment flange 14 which extends along at least a portion of the outer periphery of roof panel 12 and provides a surface for welding or otherwise attaching to a structural member of the vehicle, like a body side panel. By using a separate attachment flange made from steel, as opposed to simply attaching the aluminum roof panel directly to the vehicle by way of self piercing rivets (SPR) and adhesive, improvements may be made to the manufacturing process and the overall product. For instance, a single weld or body shop area can be used to manufacture vehicles having aluminum roofs and those having non-aluminum roofs without the need for separate and expensive equipment for administering the SPRs and the adhesive. The appearance of the overall product can also be improved by providing a roof assembly with tighter radii and a narrower roof ditch, as will be explained. Although the following description is provided in the context of a passenger vehicle having a monocoque or unibody-type construction, it should be appreciated that the present roof assembly could be used with any vehicle including, but certainly not limited to, recreational vehicles (RVs), sports utility vehicles (SUVs), semi-trucks, trucks, cars, cross-overs, and vehicles having a body-on-frame-type construction. According to the exemplary embodiment shown in FIGS. 1-2, roof assembly 10 includes a roof panel 12, an attachment flange 14 having two elongated members, and a first junction 16 for connecting the roof panel to the attachment flange. Roof assembly 10 is attached to a structural member 18 of the vehicle, such as a body side panel, by a second junction 20.

Roof panel 12 is generally a flat panel-like component and, according to this particular embodiment is made from a lightweight aluminum material and includes an outer periphery 26. Depending on the particular embodiment, roof panel 12 may have cut-outs for items like sunroofs or windows, it may have longitudinal ribs, creases or other aerodynamic features, or it may be made from a single panel or multiple panels that are joined together, to cite a few possibilities. In order to provide a significant weight savings for the vehicle, it is preferable that at least 75% of the surface area of roof assembly 10 be comprised of the aluminum-based roof panel 12; however, this is not necessary. In one embodiment, roof panel 12 is made from an aluminum-based alloy that is comprised of Al, Si, Cu, Fe, Mn and Mg; more specifically, roof panel 12 may be made from an aluminum-based alloy that includes 0.8% Si, 0.9% Cu, 0.4% Fe, 0.4% Mn, 0.7% Mg and Al as the remainder.

Attachment flange 14 extends along at least a portion of the outer periphery 26 of the roof panel and, according to one exemplary embodiment, is made from a material that includes steel. Attachment flange 14 may extend around the entire periphery or perimeter 26 of the center roof panel, or it may only extend around a portion of that periphery (as shown in FIG. 1). According to this exemplary embodiment, attachment flange 14 acts as a partial border for center roof panel 12 and includes two separate lengthwise pieces 30, 32 that generally extend along the length of roof assembly 10. In a separate embodiment (not shown here), attachment flange 14 acts as a frame and completely surrounds roof panel 12 with four pieces (two lengthwise pieces and two widthwise pieces). The different attachment flange pieces may be individual components that are stamped separately and attached to roof assembly 10, or they may be stamped or otherwise formed from a single piece of material, to cite two possibilities. The size and shape of attachment flange 14 can vary depending on the particular application, but it is generally designed to allow for a weld or braze seam that attaches roof assembly 10 to structural member 18 without the need for additional mechanical fasteners like self piercing rivets (SPR) or adhesive compounds. It should be appreciated that attachment flange 14 may be comprised of any number of individual pieces or components, and is not limited to the two-piece and four-piece examples provided above.

Figure 2:
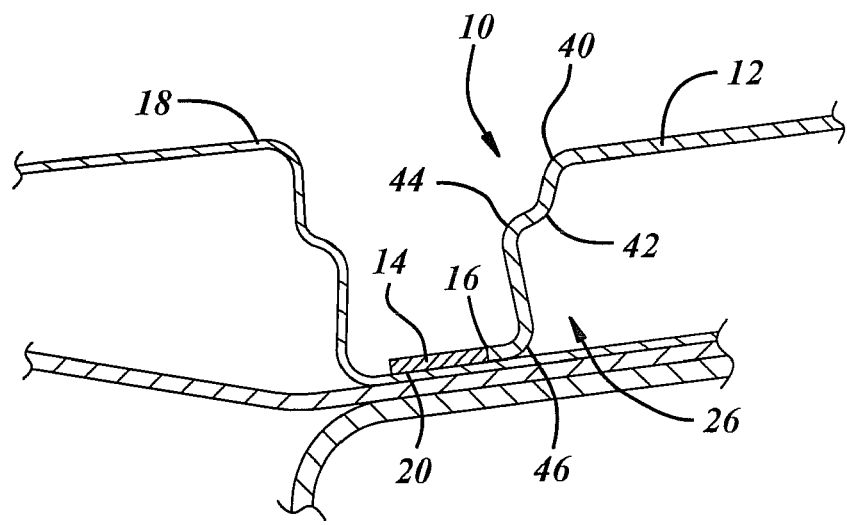
FIG. 2 is an enlarged cross-sectional view of the exemplary roof assembly of FIG. 1 where the roof assembly is mounted to a structural member of the vehicle; namely, a body side panel.
Figure 3:
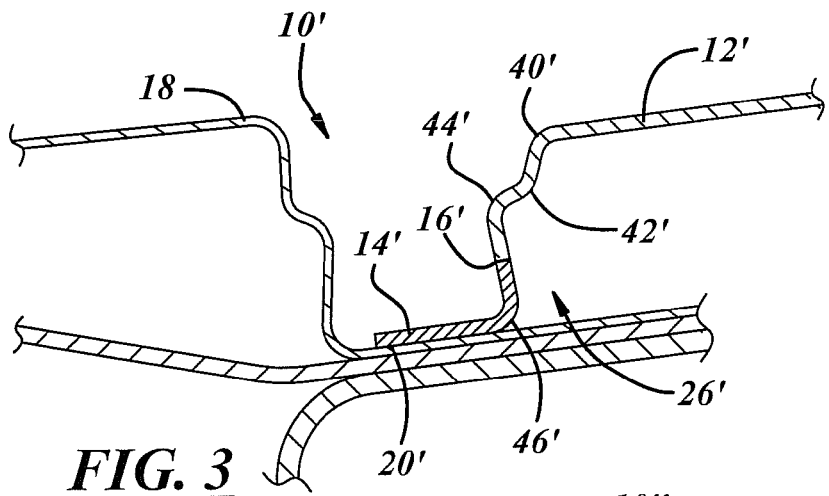
FIG. 3 is an enlarged cross-sectional view of another exemplary roof assembly where the roof assembly is mounted to a structural member of the vehicle.
Figure 4:
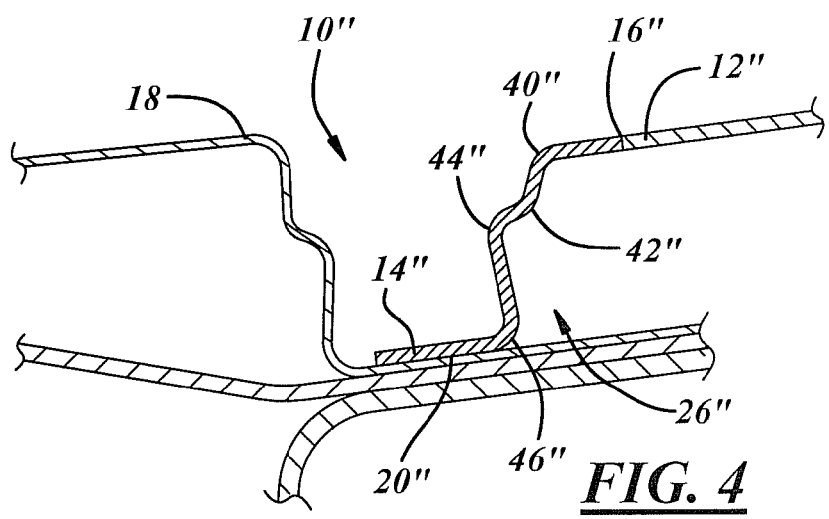
FIG. 4 is an enlarged cross-sectional view of yet another exemplary roof assembly where the roof assembly is mounted to a structural member of the vehicle.

Junction 16 joins roof panel 12 with attachment flange 14 and includes a weld seam or a braze seam. A number of different techniques may be used to attach the roof panel and the attachment flange, including the use of a junction 16 that has a butt joint and includes aluminum from roof panel 12 and steel from attachment flange 14. This butt joint can be arranged so that the outer surfaces of the roof panel 12 and the attachment flange 14 are flush with one another (as shown in FIGS. 2-4). This is particularly desirable when junction 16 is part of a 'show surface' that may be visible to the operator, such as the case in FIG. 4. Some examples of suitable techniques that may be used to form junction 16 include, but are not limited to, laser welding, laser brazing, arc brazing, and cold metal transfer (CMT). In one example, a laser brazing process using a ZnAl wire (e.g., 85% Zn, 15% Al) is used to create junction 16 and attach roof panel 12 to attachment flange 14. Of course, other types of joints like lap joints, etc. could be used in place of the exemplary butt joint described above.

Junction 20 joins the roof assembly 10 with a structural member 18 of the vehicle, such as a body side panel, and also includes a weld or braze seam. As with junction 16, any number of different techniques may be used to create junction 20. According to one exemplary embodiment, junction 20 is formed by traditional and common welding techniques, such as spot welding, which melts the material from the attachment flange 14 with that from structural member 18. This results in an overlap joint that may include material from these two different sources (in this case, steel from attachment flange 14 and steel from body side panel 18). As best shown in FIGS. 2-4, the outer surfaces of attachment flange 14 and structural member 18 are not flush with one another at junction 20; this is acceptable considering that the overlap joint is located in the roof ditch or channel and is likely covered by a roof ditch molding of some type (i.e., junction 20 is not likely a show surface). Junction 20, with its spot welds or the like, may replace SPRs, adhesive compounds and other prior art techniques for joining roof assembly 10 with structural member 18. It should be appreciated that junction 20 can be located anywhere along the interface between the attachment flange 14 and the structural member 18, and is not limited to the exemplary illustration shown in the drawings. Furthermore, junction 20 could extend across some portion of the width of attachment flange 14 instead of being a single spot weld between these two metal components. Any weld or joint suitable for securing two metal components together could be used. Any weld or joint suitable for securing at least two metal components together could be used; this includes, for example, arrangements that have more than two metal stack ups spot welded together to create junction 20.

Turning now to FIGS. 2-4, there are shown several different embodiments of roof assembly 10. In a first embodiment shown in FIG. 2, attachment flange 14 is a rather narrow flange piece that only occupies the outermost peripheral area of roof assembly 10. The roof assembly has a cross-sectional profile near outer periphery 26 that includes a number of corners or bends 40-46 so that roof panel 12 and attachment flange 14 are not coplanar. In this particular embodiment, all four of the bends 40-46 are formed in the outer periphery 26 of roof panel 12 and are not formed in attachment flange 14. Junction 16 attaches roof panel 12 to attachment flange 14 and, in this particular example, is positioned to contact the structural member 18 of the vehicle. Junction 20, on the other hand, attaches roof assembly 10 to structural member 18. Because of the close proximity of junctions 16 and 20 in this particular embodiment, it is possible for materials from one junction or interface to spill over and mix with materials from the other junction or interface. It is even possible for both junctions 16 and 20 to be formed at the same time and/or by the same piece of welding or brazing equipment.

In a second embodiment shown in FIG. 3, attachment flange 14' is a bit wider than the previous embodiment and actually includes one of the corners or bends 46'. Bends 40'-44' are part of roof panel 12' and bend 46' is part of attachment flange 14'. Because of this configuration, junction 16' which connects roof panel 12' with attachment flange 14' is lifted off of structural member 18 and is positioned to avoid contact with the structural member. Junctions 16' and 20' are spaced apart and do not contact one another like they do in the embodiment of FIG. 2. Junction 20' is comprised of materials from attachment flange 14' and structural member 18 and is largely the same as in the previous embodiment. As already mentioned, attachment flange 14' is preferably made from steel which forms better in certain ways than aluminum. Consequently, corner 46' may include a tighter radius or profile than what would be available if it were made of an aluminum-based material.

In a third embodiment shown in FIG. 4, attachment flange 14" is even wider than the two previous embodiments and includes multiple corners or bends 40"-46". Junction 16" connects roof panel 12" to attachment flange 14" and is spaced some distance from junction 20" and is positioned to avoid contact with structural member 18. In addition, junction 16" does not contact or intermix with junction 20". One potential benefit of this exemplary arrangement is that most of the metal forming or bending in the roof assembly takes place in the steel-based attachment flange 14" and not in the aluminum-based roof panel 12". Again, steel displays certain formability characteristics that are superior to aluminum and thus it may be desirable for all or some of the corners or bends 40"-46" to be located in the attachment flange, as they are here. By moving junction 16" to this elevated position, it becomes a show surface that will likely be visible to an operator; thus there may be a need for a flush or smooth interface between the two components.

During manufacturing, roof assembly 10 is securely attached to one or more body side panels or other structural members 18 of the vehicle. There are a number of different ways in which this process could occur, including the following exemplary embodiments. Roof assembly 10 with its roof panel 12 and attachment flange 14 is preassembled and is then attached or secured to the rest of the vehicle. In a first embodiment, roof panel 12 and the individual components of attachment flange 14 (in this particular embodiment, lengthwise pieces 30, 32) are stamped and formed individually so that they exhibit the desired shape and cross-sectional profile of the finished roof assembly before they are attached to one another. Once lengthwise pieces 30, 32 are properly arranged along the outer periphery 26 of roof panel 12, a laser or other type of welding or brazing apparatus may be used to form junction 16. According to one example, a laser brazing process is used with ZnAl wire to create junction 16 which extends along the lengthwise interface between an outer edge of roof panel 12 and an inner edge of attachment flange 14.

In a second embodiment for constructing roof assembly 10, roof panel 12 and the individual components of attachment flange 14 (in this particular embodiment, lengthwise pieces 30, 32) are provided as flat blanks, are joined together with junction 16 to form a blank assembly, and then the blank assembly is stamped or otherwise formed to create a contoured or shaped roof assembly 10. Instead of first being individually stamped with their final desired form, the pieces of roof assembly 10 may be provided as flat unstamped blanks, positioned according to their intended arrangement, laser welded or otherwise joined together, and then the entire blank assembly can be put into a stamping press or the like so that a desired shape and cross-sectional profile can be imparted to the part. Of course, other techniques besides the two preceding examples could also be used to construct or assembly roof assembly 10.

Figure 5:
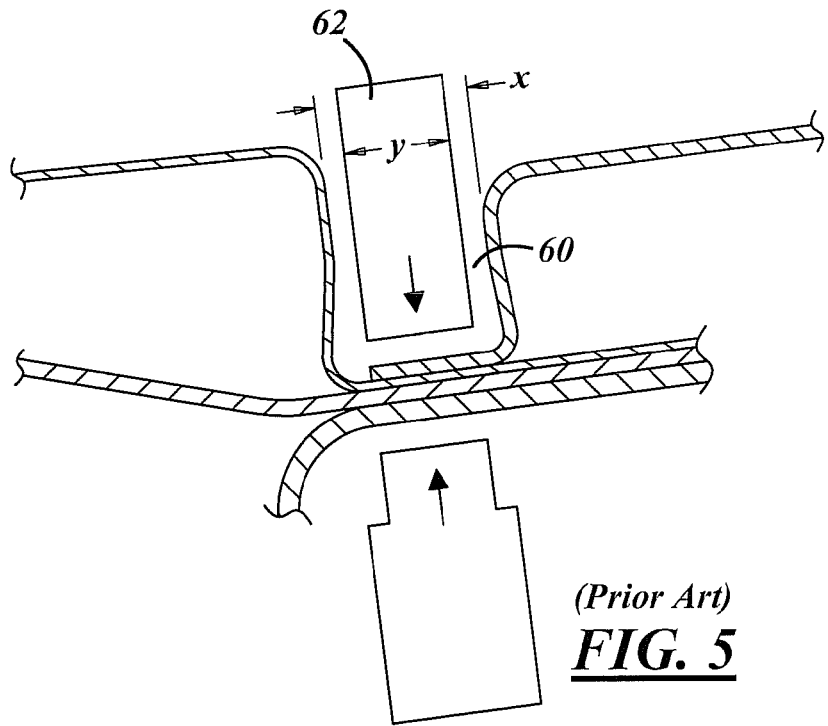
FIG. 5 is an enlarged cross-sectional view of a prior art roof assembly, where the roof assembly is mounted to a structural member of the vehicle with adhesive and self piercing rivets (SPR).

Once roof assembly 10 is formed, regardless of the technique used to do so, it may be attached to one or more structural members 18 of the vehicle. According to one possibility, roof assembly 10 is positioned on several body side panels 18 (e.g., one or more body side panels per side of the vehicle) so that a spot welder can create a series of spot welds that help form junction 20. The spot welds can extend down the length of lengthwise members 30, 32 at predetermined spacings and may be preferable over alternative techniques, like self piercing rivets (SPRs) and adhesive compounds, for several reasons. First, SPRs and adhesives require additional equipment and space on the floor of the weld or body shop instead of being able to be run on the same spot welding line that attaches non-aluminum roofs to vehicles, etc. Second, because of the shape and size of most SPR equipment, a wider roof ditch 60 is needed to accommodate the SPR equipment (see FIG. 5). In an example where an SPR head 62 having a diameter Y of 18 mm is used, a roof ditch 60 having a width X of approximately 24 mm is needed. This is significantly wider than the width of most roof ditches required for spot welding equipment, which can be as small as 13 mm, for example. Third, using SPRs to attach a roof to a vehicle can produce localized stress points and heat distortion at the rivet sites when the body in white (BIW) structure is subsequently put through high temperature paint ovens.

Although SPRs and/or adhesive compounds may be used to attach roof assembly 10 to the various structural members 18 of the vehicle, a welded junction 20 (spot welded or otherwise) may provide a watertight seal or interface between the vehicle and the roof assembly and may do so while avoiding some of the drawbacks cited above. In the exemplary embodiment of FIG. 1 where attachment flange 14 only includes two lengthwise pieces 30, 32 and does not completely extend around the periphery 26 of roof panel 12, a separate junction 70 may be created to attach the widthwise edges of roof panel 12 to widthwise structural members 72 without the use of an attachment flange. In an embodiment where attachment flange 14 completely surrounds the periphery 26 of roof panel 12 (not shown), a junction between widthwise pieces of the attachment flange and widthwise structural members may be joined in largely the same way as that described above.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A roof assembly for a vehicle, comprising:
a roof panel made from a first material;
an attachment flange made from a second material that is different than the first material; and
a junction between the roof panel and the attachment flange that includes a non-overlapping butt joint that joins the roof panel and the attachment flange together, wherein the attachment flange extends along at least a portion of an outer periphery of the roof panel and attaches the roof panel to a separate structural member of the vehicle.

2. The roof assembly of claim 1, wherein the roof panel is made from a first material that includes aluminum and the attachment flange is made from a second material that includes steel.

3. The roof assembly of claim 1, wherein at least 75% of the surface area of the roof assembly is comprised of the roof panel.

4. The roof assembly of claim 1, wherein the attachment flange only extends along a portion of the outer periphery of the roof panel and the junction between the roof panel and the attachment flange includes a weld seam or a braze seam.

5. The roof assembly of claim 1, wherein the roof assembly includes a cross-sectional profile near the junction between the roof panel and the attachment flange, and the cross-sectional profile includes a first and second bend so that the roof panel and the attachment flange are not coplanar.

6. The roof assembly of claim 5, wherein the first and second bends are part of the roof panel, and the non-overlapping butt joint is positioned to contact a surface of the structural member of the vehicle.

7. A roof assembly for a vehicle, comprising:
a roof panel made from a first material;
an attachment flange made from a second material that is different than the first material; and
a junction between the roof panel and the attachment flange that includes a non-overlapping butt joint that joins the roof panel and the attachment flange together, wherein the attachment flange extends along at least a portion of an outer periphery of the roof panel and attaches to a structural member of the vehicle;
wherein the roof assembly includes a cross-sectional profile near the junction between the roof panel and the attachment flange, and the cross-sectional profile includes a first and second bend so that the roof panel and the attachment flange are not coplanar;
wherein the first bend is part of the roof panel and the second bend is part of the attachment flange, and the non-overlapping butt joint is positioned to avoid contact with a surface of the structural member of the vehicle and is located on a side wall of a roof ditch.

8. A roof assembly for a vehicle, comprising:
a roof panel made from a first material;
an attachment flange made from a second material that is different than the first material; and
a junction between the roof panel and the attachment flange that includes a non-overlapping butt joint that joins the roof panel and the attachment flange together, wherein the attachment flange extends along at least a portion of an outer periphery of the roof panel and attaches to a structural member of the vehicle;
wherein the roof assembly includes a cross-sectional profile near the junction between the roof panel and the attachment flange, and the cross-sectional profile includes a first and second bend so that the roof panel and the attachment flange are not coplanar;
wherein the first and second bends are part of the attachment flange, and the non-overlapping butt joint is positioned to avoid contact with a surface of the structural member of the vehicle and is located outside of a roof ditch.

9. The roof assembly of claim 1, further comprising an additional junction between the attachment flange and the structural member of the vehicle, the additional junction includes an overlap joint so that the outer surfaces of the attachment flange and the structural member are not flush with one another.

10. A roof assembly for a vehicle, comprising:
a roof panel made from a first material that includes aluminum;
an attachment flange made from a second material that includes steel, wherein the attachment flange extends along at least a portion of an outer periphery of the roof panel; and
a junction between the roof panel and the attachment flange, wherein the junction includes a butt joint that has both the first and second materials and is arranged so that outer surfaces of the roof panel and the attachment flange are flush with one another.

11. The roof assembly of claim 10, wherein at least 75% of the surface area of the roof assembly is comprised of the roof panel.

12. The roof assembly of claim 10, wherein the junction between the roof panel and the attachment flange includes a weld seam or a braze seam.

13. The roof assembly of claim 10, wherein the roof assembly includes a cross-sectional profile near the junction between the roof panel and the attachment flange, and the cross-sectional profile includes a first and second bend so that the roof panel and the attachment flange are not coplanar.

14. The roof assembly of claim 13, wherein the first and second bends are part of the roof panel, and the junction between the roof panel and the attachment flange is positioned to contact the structural member of the vehicle.

15. A roof assembly for a vehicle, comprising:
a roof panel made from a first material that includes aluminum;
an attachment flange made from a second material that includes steel, wherein the attachment flange extends along at least a portion of an outer periphery of the roof panel; and
a junction between the roof panel and the attachment flange, wherein the junction includes a butt joint that has both the first and second materials and is arranged so that outer surfaces of the roof panel and the attachment flange are flush with one another;
wherein the roof assembly includes a cross-sectional profile near the junction between the roof panel and the attachment flange, and the cross-sectional profile includes a first and second bend so that the roof panel and the attachment flange are not coplanar;
wherein the first bend is part of the roof panel and the second bend is part of the attachment flange, and the junction between the roof panel and the attachment flange is positioned to avoid contact with a structural member of the vehicle.

16. A roof assembly for a vehicle, comprising:
a roof panel made from a first material that includes aluminum;
an attachment flange made from a second material that includes steel, wherein the attachment flange extends along at least a portion of an outer periphery of the roof panel; and
a junction between the roof panel and the attachment flange, wherein the junction includes a butt joint that has both the first and second materials and is arranged so that outer surfaces of the roof panel and the attachment flange are flush with one another;
wherein the roof assembly includes a cross-sectional profile near the junction between the roof panel and the attachment flange, and the cross-sectional profile includes a first and second bend so that the roof panel and the attachment flange are not coplanar;
wherein the first and second bends are part of the attachment flange, and the junction between the roof panel and the attachment flange is positioned to avoid contact with the structural member of the vehicle.

17. The roof assembly of claim 10, further comprising an additional junction between the attachment flange and a structural member of the vehicle, the additional junction includes an overlap joint so that the outer surfaces of the attachment flange and the structural member are not flush with one another.

18. A roof assembly for a vehicle, comprising:
- a roof panel made from a first material;
- an attachment flange made from a second material that is different than the first material, the attachment flange extends along at least a portion of an outer periphery of the roof panel;
- a non-overlap joint between the roof panel and the attachment flange; and
- an overlap joint between the attachment flange and a structural member of the vehicle;
- wherein the non-overlap joint is a located on a side wall of a roof ditch and the overlap joint is located at the bottom of the roof ditch such that the non-overlap joint and the overlap joint are not stacked on top of one another.

* * * * *